United States Patent
Selig, Jr.

[15] 3,678,591
[45] July 25, 1972

[54] SAILING CONDITIONS INDICATOR FOR SAILBOATS

[72] Inventor: Stanley A. Selig, Jr., 6607 E. 38th St., Indianapolis, Ind. 46409

[22] Filed: Sept. 19, 1969

[21] Appl. No.: 859,295

[52] U.S. Cl. ..........................33/263, 33/72 R, 33/272, 33/355
[51] Int. Cl. ..........................................G01c 17/02
[58] Field of Search ..............33/222 R, 222 C, 223, 222 B, 33/224, 72 R

[56] References Cited

UNITED STATES PATENTS

| | | |
|---|---|---|
| 2,590,115 | 3/1952 | Merriam et al..........................33/72 R |
| 2,192,148 | 2/1940 | Otto........................................33/223 |
| 2,303,990 | 12/1942 | Dietz..................................33/222 R |

Primary Examiner—William D. Martin, Jr.
Attorney—Woodard, Weikart, Emhardt & Naughton

[57] ABSTRACT

A compass card is provided with a 90° band of green, bordered by a 30° band of red at each end of the green. A relative position indicator has a 90° band of green on its mounting ring, the remaining 270° being red. Intersecting arch bars are secured to the ring and border the margins of the green band, the ring being affixed to the sailboat around the compass, the arches disposed over the compass, and the compass lubber line and color bands being visible at all times, the lubber line being adjustable around the compass axis.

9 Claims, 4 Drawing Figures

INVENTOR
STANLEY A. SELIG, JR.
BY
Woodard, Weikart, Emhardt & Naughton
ATTORNEYS

INVENTOR
STANLEY A. SELIG, JR.

BY

Woodard Weikart Emhardt & Naughton
ATTORNEYS

SAILING CONDITIONS INDICATOR FOR SAILBOATS

BACKGROUND OF THE INVENTION

1. Field of the Invention

This invention relates generally to instrumentation, and more particularly to a device facilitating the determination of boat position, and anticipation of wind conditions.

2. Description of the Prior Art

When sailing upwind, it is generally desirable to maintain an angle of approximately 45° between the longitudinal axis of the boat and true wind direction. It is also generally recognized that the best time in a sailboat race can be achieved by selection of the proper combination of tacks which are closest to a direct line from the starting point to any particular marker on the race course. Efforts have been made to facilitate the accomplishment of the latter, and an example is the U.S. Pat. No. 2,303,990 issued Dec. 1, 1942 to P. F. Dietz. In that patent a device having a green colored arcuate strip subtending an angle of 90° is clipped onto the boat compass when the longitudinal axis of the boat is aligned with a windward marker on the race course. Once this adjustment is made, according to the patent, the boat can be tacked in whichever direction will place the bearing point of the compass within the green band, and by continuing to tack accordingly, the boat is expected to reach the marker along the shortest route.

A problem in the use of a device such as shown and described in the Dietz patent, is the facts that as the boat changes position on the race course, the correct bearing to the marker may also change considerably, whereupon the indications provided by the device become incapable of achieving the original objective. This necessitates repeatedly changing the bearing as the boat moves along the course. The dietz device provides no means facilitating the recognition of wind direction changes as they occur, taking the proper action upon change of wind direction, or predicting future changes of wind direction. Yet all of these functions are essential to obtain the best results in sailboat racing. The present invention is directed toward enabling the skipper to determine quickly his boat position, the closest tack to the mark, the existing wind condition, changes in wind direction, expected changes in wind direction, and thereby enable him to devote more attention to other sailing functions.

SUMMARY OF THE INVENTION

Described briefly, a typical embodiment of the present invention, a compass is mounted to the sailboat so that the lubber line is movable around the axis for alignment with whatever bearing mark may be desired on the compass card. The compass card is provided with a green colored band subtending an arc of 90°, with red bands on each side subtending smaller angles, of the order of 30° each.

A relative position indicator assembly includes a ring encircling the compass housing and affixed to the sailboat with a green colored quadrant disposed to be bisected by a line on the boat parallel to the longitudinal axis thereof. The remaining three quadrants are colored red. A pair of alignment arches is provided, these intersecting at 90° and aligned with the opposite ends of the green quadrant.

By making appropriate adjustment of these components, position and wind direction can readily be determined and anticipated.

DESCRIPTION OF THE PREFERRED EMBODIMENT

Figure 1:
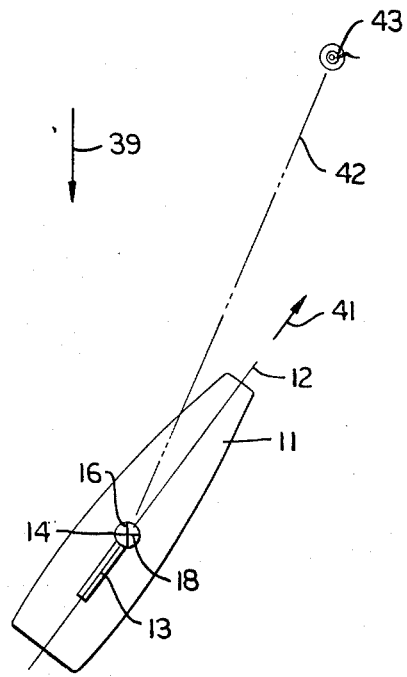
FIG. 1 is a schematic plan view of a sailboat on a port tack and employing an embodiment of the present invention.

Referring now to the drawings in detail, in FIG. 1 there is a plan view of a sailboat 11 having a longitudinal center line 12. A centerboard box 13 has the device of the present invention mounted over it in the position shown at 14. This assembly can be mounted directly to the centerboard box, or preferably to a post unit affixed to the centerboard box. The relative position indicator of the assembly has a pair of reference bars 16 and 18 thereon disposed at 90° with each other, the angle therebetween being bisected by a vertical plane containing the center line 12.

Figure 2:
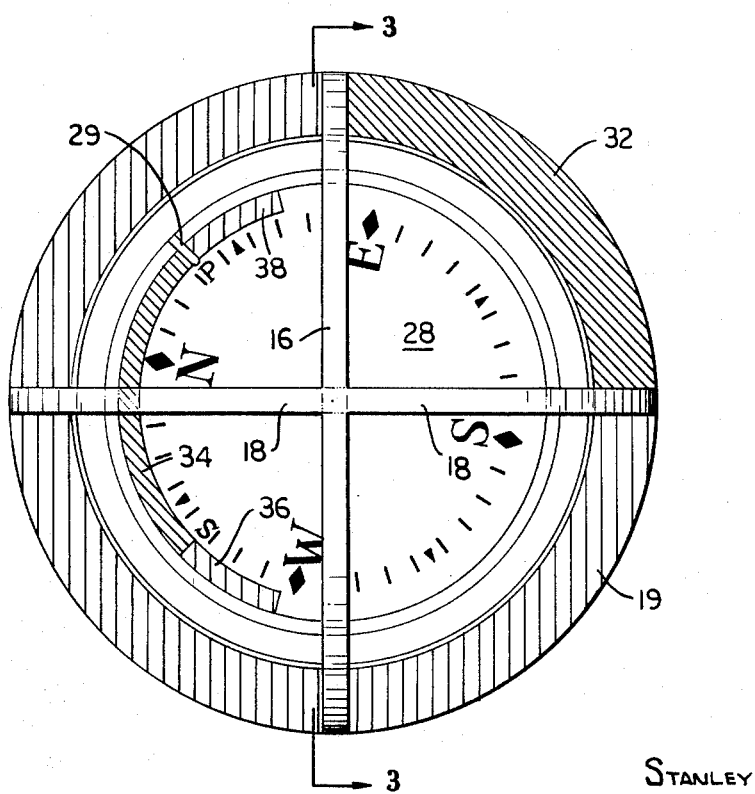
FIG. 2 is an enlarged plan view of the compass and relative position indicator according to a typical embodiment of the present invention.
Figure 3:
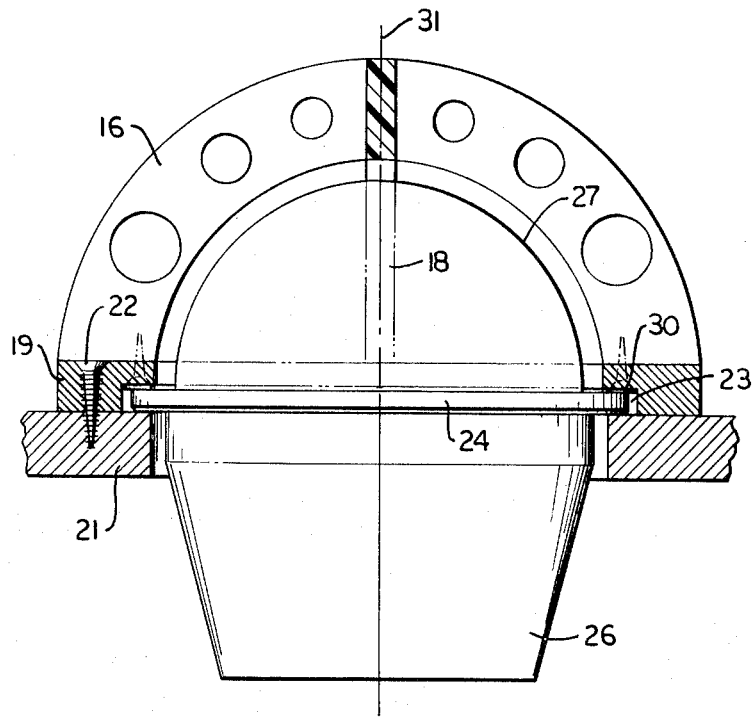
FIG. 3 is a section taken at line 3—3 in FIG. 2 and viewed in the direction of the arrows.

Referring now to FIG. 2, along with FIG. 3, the relative position indicator includes a ring-shaped mounting base 19 which may be affixed to a board 21 mounted to the post assembly affixed to the centerboard box. This may be accomplished by a plurality of circularly spaced screws 22. The ring has a circular groove or recess 23 therein which receives the mounting ring 24 of the compass 26. The transparent compass globe 27 covers the compass card (FIG. 2) 28 which is clearly visible therethrough. The compass has a lubber line 29 readily visible through the globe and alignable with the various bearing indicator lines disposed around the face of the card. The compass housing is freely turnable either clockwise or counterclockwise on its axis 31 when it is desired to do so manually, but it is not so loose as to jostle around. In other words, the space for the compass flange 24 provided between the position indicator ring 19 and the mounting board 21 is small enough that the compass can be made slightly snug in position particularly if a spring washer 30 is inserted, so that it will be turned only when gripped by the hand manually for turning. It should be understood, of course, that there may be a variety of means employed for moving the lubber line around, one possibility being a knurled knob and adjustable lubber line in a fixed compass base.

According to one feature of the invention, as mentioned above, the relative position indicator is provided with a pair of reference bars 16 and 18 thereon which, in the illustrated embodiment, are in the form of arches affixed to the mounting ring, extending over the globe and back down to the mounting ring. Each has parallel flat upstanding faces, and the arches are disposed at 90° with respect to each other. The quadrant 32 of the mounting ring between the nearest ends of the reference arches is colored green. The portion of the mounting ring extending the other 270° between these ends is colored red.

According to another feature of the invention, a quadrant of the compass card has a green arc 34 thereon, and at each end of this arc is a short arc 36 and 38, each of which is colored red and may subtend 30° for example. It is not important exactly where these 90° green and shorter red color bands appear on the compass card, so long as they are contiguous. It is also helpful, as will be seen, if the reference "P" for "port" or "L" for "left" be provided at one end of the arcuate band 34, and that the letter "S" for "starboard" or "R" for "right" be provided at the other end. As the green band is viewed from the center of the compass card, the port or left markings would appear at the right-hand end of the color band, and the starboard or right markings would appear at the left-hand of the green color band.

It should be understood that while color bands are preferred and contrasting colors green and red would typically be used, the colors on the relative position indicator matching those on the compass card, other types of contrasting indicia may also be employed, the main purpose being to provide quick and easy reference, and instill or initiate the proper type of response in the skipper upon his observation thereof.

In the use of the invention, particularly when preparing to begin a sailboat race, two steps are taken. The relative position indicator is employed to determine which end of the starting line is favored, and the compass lubber line is set. The determination of the favored end of the starting line will be discussed first, along with other functions of the relative position indicator, and then the setting of the lubber line will be discussed together with the use of the lubber line and indicator card for appraising wind conditions. Then the use of the combination of the two indicators will be discussed.

It was mentioned above that the accepted and preferred practice in sailing is to tack at 45° with respect to the true wind on a windward leg of a course. Therefore, since the reference arches are disposed at 45° angles with respect to a longitudinal axis (more usually the center line) of the boat, either one or the other of the reference arches will be aligned with the true wind. In the illustration of FIG. 1, with the boat moving in the direction of arrow 41, the boat is on a port tack and the reference bar 16 is aligned with the true wind coming in the direction of arrow 39. Automatically, therefore, the reference bar 18 is perpendicular to the true wind. On a starboard tack, the reference bar 18 is aligned with true wind, and the reference bar 16 is perpendicular to the direction of true wind. Therefore, at any time on the windward leg, one of the reference bars is on the true wind line, and the other is on the normal or perpendicular line, which may be referred to as the cross wind line.

By sighting down the true wind line bar of the relative position indicator, and noting its position on the compass card, the exact compass bearing or angle of the true wind can be ascertained. Thus the first function of the relative position indicator is locating the angle of the true wind. It is certainly preferable that this be done for the median wind direction, in the event the direction is changing from time to time.

Once a true wind line is determined, the skipper can sight along the normal line bar (18 in FIG. 1). Any object, marker, or boat ahead of the normal bar will be upwind or ahead of the boat. Any object, mark or boat behind the normal line will be down wind or behind the boat. This is true regardless of whether the mark, object, or boat is near or far away. By simply ascertaining which side of the normal line a competing boat is on, the skipper can tell whether his boat is ahead or behind (upwind or downwind) of that competing boat. The skipper thus obtains his relative position to other boats on the sailing course.

The skipper can also use the normal line bar to ascertain which end of the starting line is favored. He sails up toward the starting line until the marker at one end of it falls on the normal line (in line with the normal line bar). At this time he sights down the normal line bar to see if the other end of the starting line falls on the upwind side, right on the line, or on the downwind side of the normal line. If that other end of the starting line is on the upwind side, it is farther upwind than where the boat is positioned, and will be the favored end at which to start. If the other end of the starting line falls directly on the normal line as it is sighted down the normal line bar, neither end of the starting line is favored. If the other end of the starting line falls on the downwind side of the normal line, then the first marker sighted will be at the favored end to start.

The normal line also applies to boats on tacks opposite that of the boat employing the present invention. Therefore it tells the skipper if he can clear boats on the opposite tack if he changes his tack. If boats on the opposite tack are on the upwind side of the normal line, the skipper will pass under (behind) these boats if he tacks. If boats on the opposite tack are directly on the normal line, the skipper will be in danger of collision with them if he tacks. If behind the line, he will pass ahead of them.

The relative position indicator also serves to indicate which tack is the closest tack to the marker toward which the boat is traveling. To ascertain the closest tack, the skipper sights down the true wind line bar. If the marker which the skipper is trying to reach is on a line (42 in FIG. 1, for example) over the green quadrant 32 of the relative position indicator, the skipper is on the tack which forms the closest angle between the boat and the mark. If the marker falls on a line over the red portion of the relative position indicator ring, the other tack will be the closer to the mark, and upon adopting that tack and again sighting down the true wind line, he will find that the marker is then on a line above the green quadrant.

It is an accepted principle of sailing that a skipper should choose a tack which has the closest angle to mark. If the mark falls on the green side of the true wind reference bar, he should stay on that tack. If the mark falls on the red side, he should tack the boat so that the wind is on the opposite side of the boat. After tacking the boat will be on the closest tack to the mark and the mark will now be on the green side of the true wind reference bar.

So it is that with the relative position indicator, the skipper can, at a glance, and without memorization of numbers, know instantly which end of the starting line he should choose, which tack provides the closest angle to the mark, which tack to be on, and whether other boats are upwind (ahead), downwind (behind) or abreast of him, and thereby appraise whether he will pass ahead, behind, or strike a boat if he tacks. Because of this information provided by the relative position indicator, the skipper employing it has a tremendous advantage over the other boats. He can determine so much, so quickly, by the color coding system and reference bars, that little attention need be diverted from other sailing functions, and the loss of time and sailing distance heretofore chargeable to distractions of number compass systems are minimized or eliminated. He can sight down the ends of the plastic arcs of the reference bars and thereby extend the 45° lines visually across the water to infinity or to limits of eyesight and thus eliminate the inaccuracies previously involved with estimations of the 45° angles.

In addition to keeping on the closest tack to the mark, it is very important to know when the wind direction changes, which direction it changes, what the previous direction was, and what the direction will be in the immediate future. In the past, efforts have been made by skippers to memorize compass headings for this purpose, and add or subtract 90° from these headings as the boat tacks through 90°. This old procedure was difficult and a distraction from the attention and time needed for other sailing functions.

According to the preferred embodiment of the present invention, the compass lubber line and the margins of the green arc on the compass card can be used for a wind reference. For this purpose, shortly before the start of a race, and during a median wind, the lubber line is moved around until it lines up on the margin between the green band and one of the red bands. If the boat is on a starboard tack at the time, the lubber line is moved to the margin "R" or "S". Then, if the boat is immediately tacked through ninety degrees and placed on the port tack, the lubber line will have moved, with the boat, to alignment with the margin "P" or "L". So it is that, whichever tack the boat is on immediately prior to the start of the race, the lubber line will be adjusted to the appropriate end of the green band on the compass card. This adjustment is made by use of the knurled knob in compasses that are so equipped, or in the more rudimentary compasses, can be simply accomplished by turning the compass housing to the extent needed.

Once the lubber line setting is made for this purpose, whenever the boat is tacked through a 90° arc, so that the wind hits the opposite side of the sails, the lubber line will automatically move to the opposite end of the 90° green band 34 and come to rest again between the red and the green. Regardless of which end of the green band is in alignment with the lubber line, the lubber line will move into the red if the wind changes so that the boat is headed away from the course marker by the wind direction change. This change is known as a "header" or being headed away from the mark. If the wind direction changes so that it causes the boat to be pointed closer to the marker, the lubber line will move into the green band. This type of wind change is known as a "lift." Thus, by glancing at the lubber line, when used as a wind reference marker as just described, the skipper knows instantly if he is in a "header" or a "lift" (red or green, respectively). It is generally agreed in sailing that a skipper should not tack in a lift, and he should tack in a header. Therefore the skipper waits until the lubber line moves into the red and then he tacks. Since he tacks through a 90° angle, the lubber line will fall in the green when he completes his tack. This agrees with the sailing principle that a header on one tack is a lift on the other. While on the new tack, and with the lubber line in registry with the green band on the compass card, the skipper again waits until the wind direction heads, causing the lubber line to move into registry with the red band. Thereupon he again tacks.

It is generally agreed that if a skipper can recognize a header and tack when it hits, he can make tremendous gains upwind over the boat which fails to tack or the boat which tacks during a lift. Thus the skipper employing the present invention knows immediately the direction of the wind, and whether it is lifting him toward the mark or heading him away from the mark. Because the compass card remains constantly controlled by magnetic north, it cannot give an improper reading, regardless of tack.

It should be understood that the present invention enables the skipper to promptly determine his position in relation to objects and boats on the race course, enables the skipper to determine which tack is the closer to the mark, and enables him to appraise the wind conditions.

It is possible that there will be times when the lubber line as the wind reference marker (wind direction change indicator) may be in registry with one or the other of the red bands on the compass card, while sighting a course marker using the relative position indicator as a reference, shows that the course marker is within the green band thereon, indicating that the boat is on the closest tack to the course marker. To obey the rule (tack in a header) the skipper would violate the rule (keep on the closest tack to the mark). In this case, where the one indicator is red and the other is green, the indication is that the skipper is "out of phase" with the wind shifts or that he is on the wrong side of the race course. By basing his action on whichever indication is the stronger (more red or more green) and continuing to follow such a policy, the skipper will automatically work his boat into a position where the boat is in phase with the wind shifts. In this situation both indications are either red or green, thereby both indicators suggesting that the tack is correct, or that it should be changed, and the boat will be on the proper side of the course when the wind direction changes. Therefore once both indicators are in agreement, they will remain so, and the boat is "locked" in phase with the wind shifts. This self-locking feature is impossible with previously employed compass systems.

Occasionally it happens that the course marker is on a one tack bead, (one tack is directly toward the course marker), or due to the position of the marker and other sailboats or obstructions, only one tack is favorable. In such cases, the skipper is not concerned with whether to tack or not, as he has no choice but to remain on his present tack. In such an instance, with the present invention, the skipper can predict wind direction changes and, using the predictions, sail his boat at slightly less than 45 degrees to the true wind (known among sailors as "pinching") or sail his boat at slightly more than 45° to the true wind direction (known as "footing").

To predict future changes the skipper ascertains whether the lubber line is in the red or green band of my compass card. If the line is in the green, indicating the boat is in a lift, the skipper can assume that the next change in wind direction will be a header. Thus assuming the next change will be a header, the skipper will change his boat's angle to greater than 45°, or "foot." It is generally agreed that a boat which foots when expecting a header will reach a windward mark faster than one which maintains 45° or less (pinches). Thus if the lubber line falls in the green, the skipper should foot.

The opposite holds true if the lubber line falls in the red (header). If the skipper is in a header, he can reasonably expect a lift. It is generally accepted that a benefit can be obtained by pinching (less than 45°) if a lift is expected. Thus my compass predicts future wind direction changes and thus solves one of the oldest questions of sailing "should the skipper pinch or foot?"

Figure 4:
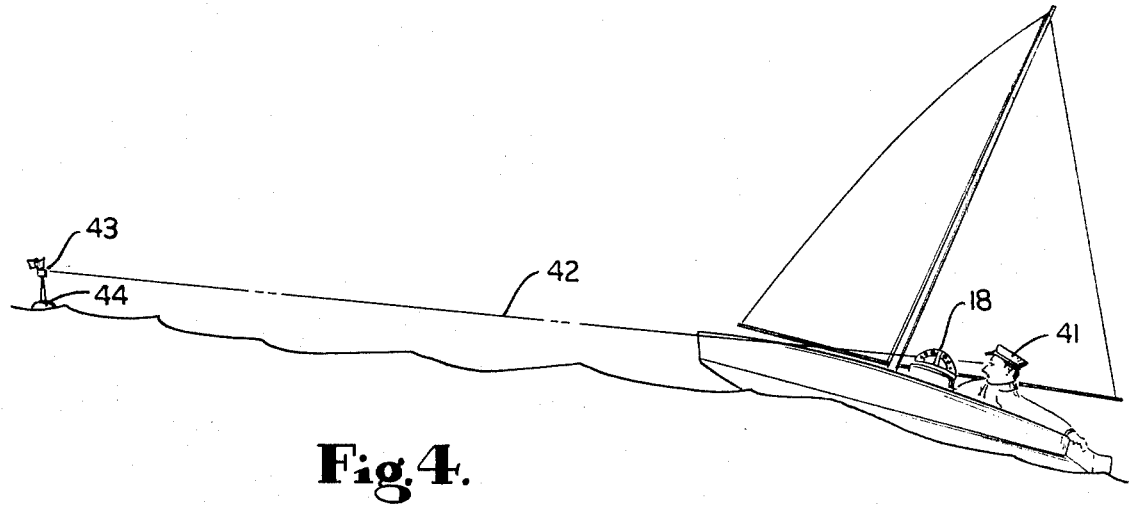
FIG. 4 is an elevational view corresponding to FIG. 1, with the boat heeled over at about 10°.

FIG. 4 illustrates another feature of the present invention. In this instance, with the sailboat on a port tack, and heeling heavily to starboard, the skipper 41 is nevertheless able to obtain a direct line of sight 42 across the top of the compass to a course marker 43 at the horizon 44. This is because the elevation of the assembly in the boat is comparatively high, and the arcuate shape of the reference bars 16 and 18 as well as their mounting directly over the compass, and the flat faces thereof, permit sighting along them, or keeping them within the scope of vision while the course marker is in focus. Thus it is possible to use the present invention in spite of the variety of attitude changes of the boat.

Another unique feature of the invention is that the skipper can use it to advantage, even though he does not have the mark he is trying to reach in sight. Such instances might include but not be limited to: 1. situations where low visibility or other sailing craft osbtruct vision; 2. situations where the racing instructions supplied give compass headings between markers of the sailing course; 3. long distance sailing courses where destination points may fall below the horizon, such as trans-oceanic races.

If the skipper cannot see the course marker he is attempting to reach, due to visual obstruction, and he has only a general knowledge of its location, he can refer to the lubber line on the compass card, adjusted as described above, and rely solely on the general sailing rules i.e. "tack in the headers—avoid tacking in the lifts." Using this system the skipper will work his boat farther and farther up wind and eventually reach a point close enough to the marker that he can locate it visually.

The skipper can use the relative position indicator, also without visually sighting the mark, if he can learn the compass bearing of the mark. The magnetic bearing of the windward mark in some instances may be given by the racing committee which is in charge of setting up the racing course. The magnetic bearing of the course marker may also be obtained by navigation techniques such as radio compass, dead reckoning or cellestial navigation. For instance, a sailing craft leaving England would obtain a magnetic bearing on New York. Whatever the means used, the skipper refers to the compass card magnetic bearing markings to locate on the card the magnetic bearing of his desired mark (New York). Upon locating this bearing, he ascertains if the bearing falls within the sector of the 90° green band (of the relative position indicator) or in the red band thereof. If the magnetic bearing falls in the green, the boat is sailing on the closest tack to the desired mark (New York); if the magnetic bearing aligns with the red band on the relative position indicator, the other tack will be closer to the mark and the skipper should tack.

In ocean racing, it might happen that several boats racing in the near vicinity, but out of sight of each other, would be in danger of collision while tacking upwind. By obtaining a bearing (through use of a radio compass or navigation techniques) on any other boat in the vicinity, the skipper can again refer to that magnetic bearing on the compass card of my invention, and ascertain whether that bearing lies on, behind, or in front of the cross wind reference arch of my relative position indicator. Using this reference, the skipper can ascertain whether or not a tack into the vicinity of the other boat will result in danger of collision.

Thus the system of my invention will benefit the skipper even though he cannot visually determine the exact location of the mark he desires to reach. By knowing the magnetic bearings of other markers, objects, and boats, the skipper can benefit from all the features of the invention without visual sighting of such other markers, objects and boats.

The invention claimed is:

1. A sailing condition indicator comprising:
a compass having a movable magnetic-North-controlled card therein, said card having thereon a quadrant with a quickly distinguishable first mark thereon subtending 90° and contrasting with a background, said card having a pair of sectors, one bordering each end of said quadrant and having second marks therein subtending angles less then 90° and quickly discernable and distinguishing from said first mark and from said background, and a relative position indicator member associated with said compass and including a pair of linear reference means thereon disposed at 90° with respect to each other, a first mark on said member subtending one quadrant between said reference means and matching said first mark on said compass card, a second mark on said member subtending the other 270° and matching said second marks on said compass card.

2. The indicator of claim 1 wherein:

said indicator member includes a base, and said reference means include first and second portions beginning at said base and extending upward therefrom.

3. The indicator of claim 2 wherein each of said portions has a flat reference face thereon lying in a plane perpendicular to the plane of the reference face of the other portion.

4. The indicator of claim 3 wherein said base is a ring and said portions are arches intersecting each other above said compass card.

5. The combination of claim 1 and further comprising:

a boat having said indicator member mounted thereon with a line bisecting said first mark thereof parallel to a line oriented in the direction of a longitudinal axis of said boat.

6. The combination of claim 5 wherein:

said compass includes a reference line movable independently of said card and visible through said indicator member and manually movable relative to said boat to any point within a circle.

7. The combination of claim 6 wherein:

said first marks are green, and said second marks are red.

8. The combination of claim 5 wherein:

said linear reference means are disposed sufficiently high on said boat to accommodate sighting therealong to a marker at the horizon while said boat is heeled over.

9. The combination of claim 8 wherein:

said linear reference means are in the foreground of said compass card.

* * * * *